United States Patent

Gevertz et al.

[11] Patent Number: 5,820,766
[45] Date of Patent: Oct. 13, 1998

[54] REDUCTION OF SULFIDE IN FLUIDS

[75] Inventors: Diane Gevertz, San Diego, Calif.; Gary E. Jenneman, Bartlesville, Okla.

[73] Assignee: Phillips Petroleum Company, Bartlesville, Okla.

[21] Appl. No.: 842,296

[22] Filed: Apr. 23, 1997

[51] Int. Cl.$^6$ .................................................. C02F 1/76
[52] U.S. Cl. ................ 210/753; 210/754; 210/916; 208/248; 208/230; 208/226; 208/196; 208/189; 208/240; 208/241; 423/242.1; 423/243.01; 423/243.08; 423/243.06
[58] Field of Search .................. 210/916, 753, 210/754; 208/248, 208 R, 226, 196, 189, 230, 240, 241; 423/242.1, 243.1, 243.08, 243.06

[56] References Cited

U.S. PATENT DOCUMENTS 4,874,530  10/1989  Kobayashi et al. ..................... 210/737

OTHER PUBLICATIONS

Merck Index, 10th ed. 91983), p. 1231.

CA 74:57205c (1971).

*Primary Examiner*—Neil McCarthy
*Attorney, Agent, or Firm*—Lucas K. Shay

[57] ABSTRACT

A composition and a process for substantially reducing or removing sulfide from a sulfide-containing fluid are disclosed. The composition comprises, or is prepared by combining components comprising, a sulfide-containing fluid and a sulfide-scavenging amount of a sulfide scavenger selected from the group consisting of bromates, iodates, and combinations of two or more thereof. The process comprises contacting a sulfide-containing fluid with a sulfide-scavenging amount of a sulfide scavenger under a condition sufficient to substantially reduce the sulfide concentration in the fluid.

16 Claims, 1 Drawing Sheet

REDUCTION OF SULFIDE IN FLUIDS

FIELD OF THE INVENTION

The present invention relates to a composition which comprises, or is prepared by combining, a sulfide-containing fluid and a sulfide-scavenging amount of a sulfide scavenger such as, for example, a bromate, and to a process for reducing sulfide content in a sulfide-containing fluid.

BACKGROUND OF THE INVENTION

The presence of hydrogen sulfide in a fluid such as, for example, during the production, gathering and processing of oil or gas is a serious problem due to its toxicity, corrosivity, odiferous nature and its propensity to form insoluble metal sulfides that can plug pores in reservoir rock. Typically, chemical and physiochemical methods having been used to reduce or remove $H_2S$ during a "sweetening" process which is generally known to one skilled in the art. Materials used in the sweetening process are often referred to as sulfide scavengers and generally can be classified as either adduct-forming agents, precipitors, or oxidizers. Some of the materials used are oxygen, peroxide, amines, iron oxides, nitrite, aldehydes, etc. However, many of these chemicals have drawbacks that preclude their use such as, cost, lack of specificity, slow reaction rates, reversibility, toxicity, or combinations of any two or more thereof. Therefore, there is an ever increasing need to develop a fluid, or to develop a process for producing a fluid, that is substantially free of a sulfide.

SUMMARY OF THE INVENTION

An object of the invention is to provide a fluid composition that has reduced sulfide content or is substantially free of a sulfide. Another object of the invention is to provide a process for producing the fluid composition. An advantage of the invention is that a sulfide in the fluid composition is rapidly, substantially converted to insoluble elemental sulfur that is nontoxic or low in toxicity and can be removed from the fluid. Other advantages and objects will becomes more apparent as the invention is more fully disclosed hereinbelow.

According to a first embodiment of the invention, a composition is provided which can comprise, consist essentially of, consist of, or be prepared by combining, a sulfide-containing fluid and a sulfide-scavenging amount of sulfide scavenger selected from the group consisting of bromates, iodates, and combinations of two or more thereof.

According to a second embodiment of the invention, a process is provided which comprises contacting a sulfide-containing fluid with sulfide-scavenging amount of sulfide scavenger selected from the group consisting of a bromates, iodates, and combinations of two or more thereof under a condition sufficient to substantially reduce the sulfide concentration in the fluid.

DETAILED DESCRIPTION OF THE INVENTION

Figure 1:
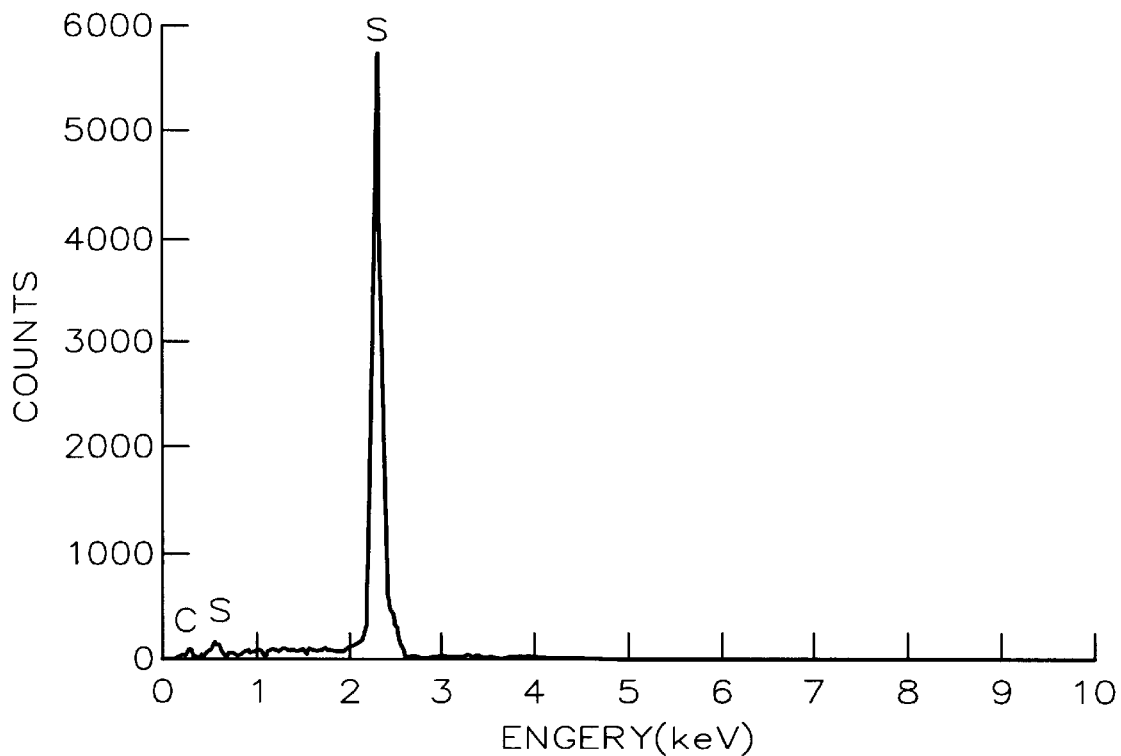
FIG. 1 is an energy dispersive spectrum of the filtrate obtained from a fluid containing a bromate.

The term "fluid" used herein refer to, unless otherwise indicated, liquid, gas, or combinations thereof. Examples of fluids include, but are not limited to, water, a solution, a suspension, an emulsion, oil, gasoline, natural gas, liquid natural gas, natural gas liquid, or combinations of two or more thereof wherein a suspension can contain partially dissolved or dispersed or undissolved substances. Examples of suspensions include oil or gas in water or an aqueous solution, clay in a liquid medium, a produced brine which is coproduced with oil or gas and can contaminate with oil or gas, or both. The term "substantial(ly)" denotes "more than trivial" and can be nearly entirely.

Any sulfide that can be oxidized to elemental sulfur can be included in the first embodiment of the present invention. The sulfide can be an inorganic sulfide or an organic sulfide. Examples of suitable sulfides include, but are not limited to, hydrogen sulfide, iron sulfide, ammonium sulfide, sodium sulfide, potassium sulfide, lithium sulfide, calcium sulfide, magnesium sulfide, ammonium hydrosulfide, sodium hydrosulfide, potassium hydrosulfide, lithium hydrosulfide, dimethyl sulfide, diethyl sulfide, dimethyl disulfide, and combinations of two or more thereof. Presently it is preferred that the sulfide be hydrogen sulfide because it is widely present in oil or gas, or both.

According to the invention, any bromate or iodate that can oxidize a sulfide to a low toxicity product including, but not limited to, sulfite, sulfate, thiosulfate, polythionates, elemental sulfur, or combinations of two or more thereof can be used in the composition of the invention. It is preferred that a sulfide be substantially oxidized to elemental sulfur by a bromate. The bromate can be an inorganic bromate or an organic bromate. Examples of suitable bromates include, but are not limited to, an alkali metal bromate such as lithium bromate, sodium bromate, and potassium bromate; an alkaline earth metal bromate such as beryllium bromate, magnesium bromate, and calcium bromate; ammonium bromate; an alkali metal iodate such as lithium iodate, sodium iodate, and potassium iodate; an alkaline earth metal iodate such as beryllium iodate, magnesium iodate, and calcium iodate; ammonium iodate; and combinations of two or more thereof.

The sulfide is generally present in the composition in a small quantity, as compared to the total fluid, which can be in the range of from about 0.00001 to about 10, preferably about 0.00005 to about 5, and most preferably 0.0001 to 3 weight % based on the total weight of the composition equaling 100%. The sulfide scavenger can be present in the composition in a sulfide-scavenging amount that is sufficient to oxidize the sulfide present. Generally, the quantity of a sulfide scavenger can be in the range of from about 0.00001 to about 15, preferably about 0.0001 to about 10, and most preferably about 0.0001 to about 5 weight % based on the total weight of the composition equaling 100%. The fluid generally makes up the rest of the composition. Generally, it is preferred that the composition has a pH of lower than 11.0, preferably lower than 10.5, more preferably lower than about 10.25, and most preferably lower than 10.0.

The fluid composition generally can also comprise other substances commonly associated with a solution, a suspension, oil, gas, or combinations of two or more thereof. Such substances can be metal salts, ammonium salts, clays, weighting agents such as borite, hematite, calcium carbonate and galena, or combinations of any two or more thereof.

The fluid composition is generally produced by combining the elements comprising, consisting essentially of, or consisting of, a sulfide-containing fluid and a sulfide scavenger in any suitable manner in the quantities disclosed above. Once the composition is prepared, a product such as, for example, an insoluble elemental sulfur is generally formed which can be recovered or removed by any means known to one skilled in the art such as, for example, filtration, decantation, centrifugation, sedimentation, and combinations of two or more thereof. The composition thus prepared is a sulfide-reduced or substantially sulfide-free fluid that can be used in a variety of applications such as, for example, water injection for improving recovery of oil, oil and gas sales, disposal to well or stream or in refining of crude oil.

According to the second embodiment of the invention, a process for substantially reducing the sulfide content of a sulfide-containing fluid comprises contacting the fluid with a sulfide-scavenging amount of a sulfide scavenger. The definition and scope of sulfide, fluid, or bromate are the same as those disclosed above. The quantity or concentration of sulfide as well as sulfide scavenger used in the process is also the same as that disclosed above.

The process can be carried out in any suitable manner in any suitable reactor or vessels known to one skilled in the art. The process can be carried out in batch mode, semicontinuous mode, or a continuous mode. For example, in a continuous mode, a sulfide-containing fluid can continuously flow through a fixed reactor containing a sulfide scavenger which can be continuously supplied to the reactor and the reactor content can be controlled by weight or volume with continuous discharge of reactor content.

The process can be carried out under any ambient conditions so long as the sulfide in a fluid can be substantially reduced or removed. Generally, the process can be carried out in a suitable pH range than can reduce the sulfide concentration in the fluid and can be lower than about 11.0, preferably lower than about 10.5, more preferably lower than about 10.25 and most preferably lower than 10.0; at a suitable temperature in the range of from about 0° to about 100° C., preferably about 5° to about 80° C., and most preferably 10° to 60° C.; under a pressure in the range of from about 0.5 to about 20 atmospheres, preferably about 1 to about 10 atmospheres; and for a time period sufficient to substantially oxidize the sulfide, generally about 0.01 minute to about 30 hours depending on the concentration of sulfide in the fluid as well as the concentration of bromate. The concentration of sulfide in the fluid can range widely from about 0.00001 to about 5 weight % as disclosed above. The quantity of sulfide scavenger required is the quantity that can substantially oxidize the sulfide and can be in the range of from about 0.0001 to about 15 weight % as disclosed above in the first embodiment of the invention.

The following examples are provided to further illustrate the process of the invention and should not be unduly construed as to limit the scope of the invention.

EXAMPLE I

This example illustrates the present invention.

Produced brine used in this example and the following examples was collected at the Coleville oil field in Saskatchewan, Canada, in one-liter, screw-capped, glass bottles that had previously been degassed in an anaerobic chamber (85% $N_2$, 10% $H_2$, 5% $CO_2$) to remove traces of oxygen. The caps contained a butyl rubber septum to prevent intrusion of oxygen. The collection site was near the water outlet of the free water knockout (FWKO). Bottles were filled to the bottle neck allowing a small amount of volume for gas expansion. Bottles were immediately shipped to the laboratory and, received within one–two weeks of collection. Upon receiving the brine it was placed in an anaerobic chamber and 50 cc dispensed into anaerobic, serum bottles (63 cc capacity). The following oxidizers were made up as 1M stock solutions and added to each serum bottle at a final concentration of 5 mM: $NaClO_4$, $NaClO_3$, and $NaBrO_4$. Also, each bottle was amended with sodium dihydrogen phosphate at a final concentration of 100 $\mu$M. Bottles were then stoppered with butyl rubber stoppers and crimp sealed. All bottles were incubated at 30° C.

Immediately upon crimp sealing each bottle a liquid sample was withdrawn from each bottle and sulfide determined by the method of Fogo and Popowski (Fogo, J. K. and Popowski, M., "Spectrophotometric Determination of Hydrogen Sulfide," *Analytical Biochemistry* 21, 732–734 (1949)). Additional samples were taken at 1, 2 and 3 days following addition of the oxidizers. The results are shown in Table 1 as average values for the three replicates.

TABLE 1

Effect of Chlorate and Perchlorate vs. Bromate on Removal of Sulfide From an Oil Field Produced Brine

| Time | Sulfide (mg/l) | | | |
|---|---|---|---|---|
| (days) | None | $NaClO_4$ | $NaClO_3$ | $NaBrO_3$ |
| 0[a] | 149 | 121 | 122 | <3.3 |
| 1 | 131 | 145 | 118 | <3.3 |
| 2 | 130 | 107 | 109 | not determined |
| 3 | 118 | 112 | 119 | not determined |

[a]Calculated to be about 10 minutes following addition of oxidizer.

The results show that sodium bromate, but not sodium perchlorate or chlorate, resulted in rapid removal of sulfide from the brine.

EXAMPLE II

This is a comparative example showing that known chemical oxidizers do not rapidly reduce sulfide in fluids.

Additional serum bottles containing FWKO brine were prepared as in Example I except that the brine was filter-sterilized using 0.2 $\mu$m membrane filter to remove any bacteria that might be involved in the oxidation reaction. Also, no phosphate was added to the brine. Two different known chemical oxidizers were added to the brine, $NaBO_3$ and Sulfa-Chek EC90201. Sulfa-Chek EC90201 is a commercial sulfide scavenger sold by Nalco/Exxon and contains the known sulfide oxidizer, $NaNO_2$. Sodium borate was made up as a 500 mM stock solution in anaerobic de-ionized water and added, to the brine, at a final concentration of 5 mM, whereas, Sulfa-Chek was added to the brine at 3 different dilutions (1/2000, 1/1000 and 1/500, all vol/vol) in order to target a nitrite (i.e., active ingredient) concentration close to 5 nM. A set of controls without oxidizer was also run. Tests and controls were run in triplicate.

Sulfide measurements were made using a sulfide detection kit (e.g., Aquaquant test kit, EM Sciences). Sulfide was measured on the liquid phase of each sample after 1 day, 2 days and 15 days incubation at 23° C. The results are shown in Table II and represent the average of the three replicates. The pH of each brine following the final sampling is also presented.

TABLE II

Effect of Different Concentration of Sulfa-Chek[a] and Sodium Borate on Removal of Sulfide from Filter-Sterilized Coleville Brine

| | Sulfide (mg/L) | | | | |
|---|---|---|---|---|---|
| Time | | Dilutions of Sulfa-Chek (EC90201)[a] | | | Sodium borate |
| (days) | no addition | 1:2000[b] | 1:1000[c] | 1:500[d] | 5 mM |
| 1 | 104 | 104 | 104 | 104 | 128 |
| 2 | 104 | 104 | 104 | 104 | 104 |
| 15 | 96 | 24 | 8 | 9 | 120 |
| | pH = 7.5 | pH = 8.5 | pH = 8.9 | pH = 9.0 | pH = 8.6 |

[a]Sulfa-chek in an $H_2S$ scavenger obtained from Nalco/Exxon and comes as a solution containing (all %): polysulfide, 1–5; sodium hydroxide, 0.1–1; and sodium nitrite, 20–40.
[b]1.4–2.4 mM nitrite.
[c]2.8–5.6 mM nitrite.
[d]5.6–11.2 mM nitrite.

Table II shows that no significant reduction in sulfide concentration was evident for any of the samples during the first two days of incubation. However, following 15 days, the sulfide levels in those bottles containing Sulfa-Chek were significantly reduced but those of the control and those containing sodium borate were not. It took between 2 and 15 days to see a noticeable reduction in sulfide upon addition of Sulfa-Chek. These results demonstrate that other known chemical oxidizers (Sulfa-Chek and sodium borate), under the conditions tested, do not remove sulfide from the brine as rapidly as bromate (Example I). The pH values (8.5–9.0) measured in the brine following the test were similar.

EXAMPLE III

To determine the effect of different concentrations of bromate on oxidation of sulfide in produced brine, another set of bottles was prepared using the procedure in Example II except that 100 cc of brine was dispensed into 120 cc serum bottles. Sodium bromate was added to the brine at a final concentration of 0, 1.0, 2.5, and 5.0 mM. Sulfide was measured prior to bromate addition on at least one bottle from each set and determined to be between 80 and 96 mg/l. All bottles were incubated a 23° C. Sulfide was measured on each bottle at 0.5, 1.0 and 5.0 hours following bromate addition.

The results of the tests are shown in Table III. The removal rate was dependent on bromate concentration. Within 30 minutes both 2.5 and 5.0 mM sodium bromate had removed almost all of the sulfide, whereas, sulfide levels averaged 26 mg/l for the bottles containing 1.0 mM bromate. Sulfide concentrations leveled off within one hour indicating that the reaction had reached completion. Therefore, roughly 1.0 mole of bromate is required to remove a mole of sulfide at the two higher concentrations of bromate used, while 1.0 mole of bromate removed almost 1.6 moles of sulfide at the lowest bromate concentration. This example confirms that the rates of sulfide removal using bromate are very rapid and can be dependent on the concentration of bromate used.

TABLE III

Effect of Different Bromate Concentrations on Removal of Sulfide from Filter-Sterlized[a] Coleville

| | Sulfide (mg/L) | | | |
|---|---|---|---|---|
| Time (hrs) | no addition | 1.0 mM $NaBrO_4$ | 2.5 mM $NaBrO_4$ | 5.0 mM $NaBrO_4$ |
| 0.5[b] | ND[c] | 26 | 4 | 0 |
| 1.0 | 96 | 26 | 0 | ND |
| 5.0 | 96 | 26 | ND | ND |

[a]Sterile-filtered through a 0.2 μm membrane filter.
[b]Sulfide prior to bromate addition was 96–104 mg/L.
[c]ND, not determined.

EXAMPLE IV

This example illustrates the ability of bromate to remove sulfide from a non-brine solution such as, for example, deionized water.

The runs were carried out with anaerobic deionized water prepared by bubbling $O_2$-free nitrogen through water heated to 90° C. contained in a 1 liter, screw cap bottle. Following de-gassing, the cap was screwed on tight and the water was allowed to cool in an anaerobic chamber. This water was then added in 100 cc amounts to 120 cc serum bottles. To one set of three serum bottles was added a pH buffer comprised of 100 mM of $K_2HPO_4$ adjusted to pH 7.5 with HCl while the other set was left unbuffered (pH 10.5). Sodium sulfide was then added to both sets of serum bottles to give a final sulfide concentration of 80–104 mg/l.

Table IV shows the results of the test following 0.5, 5.0 and 4 days incubation at 23° C. The results show that complete removal of the sulfide occurred in the set of bottles buffered at a pH of 7.5 within 30 minutes, while no removal occurred in bottles at pH of 10.5. In fact, after 4 days at the higher pH, sulfide levels had only decreased by 23%. This indicates that the rate of sulfide removal by bromate has a dependency on pH and that removal of sulfide by bromate will occur just as rapidly in a non-brine solution as in field brine when performed at a comparable pH.

TABLE IV

Effect of pH on Removal of Sulfide in De-ionized Water[a] Containing 5 mM Sodium Bromate

| | Sulfide (mg/L) | | | |
|---|---|---|---|---|
| | pH = 7.5[b] | | pH = 10.5 | |
| Time | no addition | 5 mM $NaBrO_4$ | no addition | 5 mM $NaBrO_4$ |
| 0.5 hrs | 80 | 0[c] | 104 | 104 |
| 5.0 hrs | ND[d] | ND | 104 | 104 |
| 4 days | ND | ND | 104 | 80 |

[a]Anaerobic water.
[b]Buffered with 100 mM $K_2HPO_4$.
[c]Removal was instantaneous.
[d]ND, not determined.

EXAMPLE V

This example shows the products formed following the addition of a sulfide reducer to a sulfide-containing fluid. This example also shows that an iodate can also be successfully used in the invention.

A 500 mM stock solution of sodium bromate and a 250 mM stock solution of potassium iodate stock were prepared.

Both stock solutions were prepared inside an anaerobic chamber by dissolving the two chemicals in anaerobic de-ionized water. Either borate or iodate was then added at a final concentration of 5 mM to serum bottles (i.e., 3 bottles each) containing 100 cc of anaerobic de-ionized water consisting of 2.4 mM sodium sulfide and 100 mM $K_2HPO_4$ at a pH of 8.8 or 7.5. Adjustment of pH to 7.5 was performed by adding HCl. Controls containing sulfide and phosphate without bromate or iodate were also run.

After approximately 15 minutes or 30 minutes at 23° C., each bottles was sampled and tested for the presence of sulfide. Table V presents the results.

TABLE V

Effect of pH on Removal of Sulfide by Bromate and Iodate

| | Sulfide (mg/l) | | | | | |
|---|---|---|---|---|---|---|
| Time (hrs) | None | pH = 7.5 NaBrO$_3$ | KIO$_4$ | None | pH = 8.8 NaBrO$_3$ | KIO$_4$ |
| 0.25 | 80 | <4 | <4 | ND | ND | ND |
| 0.5 | ND | ND | ND | 80 | 75 | <4 |
| 19 | 80 | <4 | <4 | 80 | <4 | ND |

ND, not determined.

Figure 2:
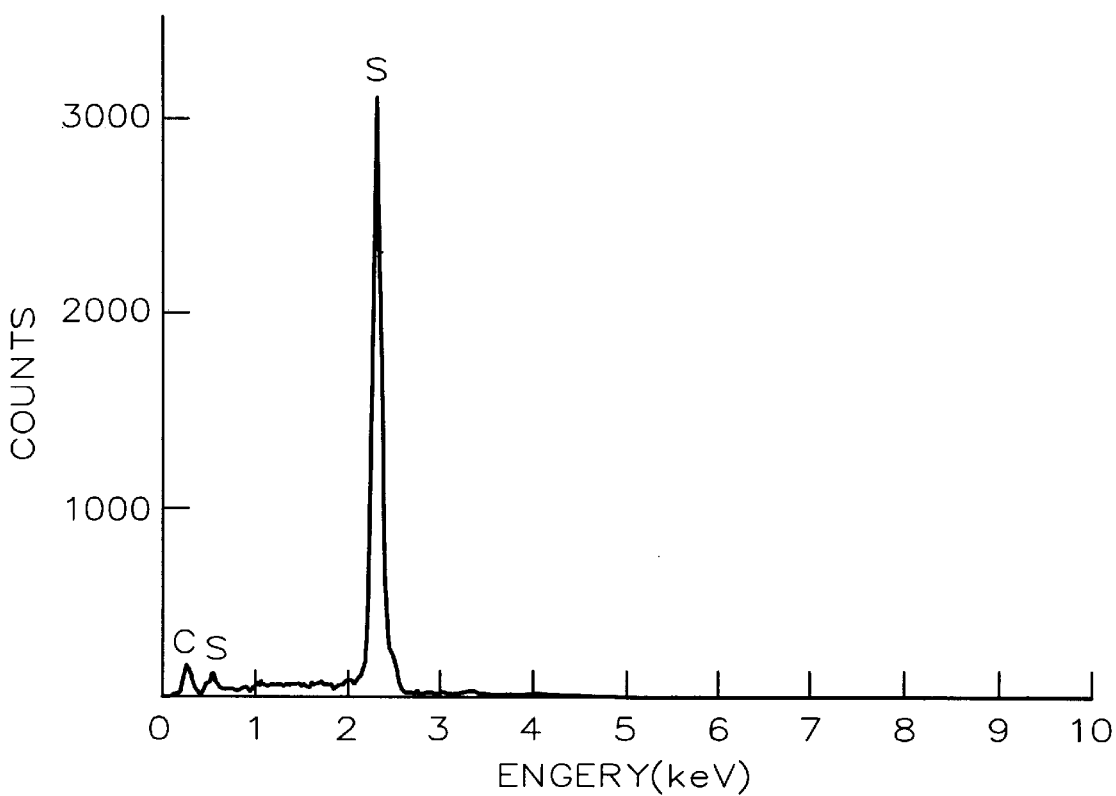
FIG. 2 is an energy dispersive spectrum of the filtrate obtained from a fluid containing an iodate.

The results shown in Table V not only confirm the effectiveness of bromate in reducing sulfide levels but also indicate the effectiveness of iodate. In fact, iodate displays a faster rate of removal than bromate at a pH of 8.8. During the time when removal of the sulfide was observed it was noticed that a cloudy, white precipitate would form in test bottles containing bromate or iodate. This precipitate was filtered onto a 0.2 μm membrane filter (Nucleopore Corp.), air dried, and examined by scanning electron microscopy. Photomicrographs from both the bromate-treated and iodate-treated samples revealed an abundance of sulfur crystals. This predominance of sulfur crystals was supported by the energy dispersive spectra (EDS) from the two samples. FIG. 1 represents the EDS of bromate-treated fluid sample and FIG. 2 represents the EDS of iodate-treated fluid sample that was obtained by an energy dispersive system (Noran, Madison, Wis.). Examination of the soluble fraction of the two test samples after bromate addition (i.e., 19 hours) revealed a 23% increase in sulfate-sulfur but no increase in sulfite (Table VI). Therefore, at least 77% of the sulfide-sulfur oxidized was likely converted to elemental sulfur for the bromate-amended sample. Whereas in the iodate-amended sample, 23% sulfate-sulfur and 17% thiosulfate sulfur were assayed indicating a 60% conversion of sulfide-sulfur to elemental sulfur.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A process consisting essentially of contacting a sulfide-containing fluid derived during the production, gathering and processing of oil or gas with a sulfide-scavenging amount of a sulfide scavenger selected from the group consisting of bromates, iodates, and combinations of two or more thereof.

2. A process according to claim 1 wherein said sulfide is present in said fluid in the range of from about 0.00001 to about 10 weight % and is selected from the group consisting of hydrogen sulfide, iron sulfide, ammonium sulfide, sodium sulfide, potassium sulfide, lithium sulfide, calcium sulfide, magnesium sulfide, ammonium hydrosulfide, sodium hydrosulfide, potassium hydrosulfide, lithium hydrosulfide, dimethyl sulfide, diethyl sulfide, dimethyl disulfide, and combinations of two or more thereof.

3. A process according to claim 1 wherein said sulfide is hydrogen sulfide and is present in said fluid in an amount of 0.0001 to 3 weight %.

4. A process according to claim 1 wherein said fluid is a produced brine and said sulfide scavenger is present in said fluid in an amount in the range of about 0.00001 to about 15 weight %.

5. A process according to claim 3 wherein said fluid is a produced brine and said sulfide scavenger is present in said fluid in an amount of 0.0001 to 5 weight %.

6. A process according to claim 1 wherein said fluid is natural gas and said sulfide scavenger is present in said fluid in an amount of 0.00001 to 15 weight %.

7. A process according to claim 3 wherein said fluid is natural gas and said sulfide scavenger is present in said fluid in an amount of 0.0001 to 5 weight %.

8. A process according to claim 2 wherein said sulfide scavenger is present in said fluid in an amount of 0.00001 to 15 weight % and is selected from the group consisting of lithium bromate, sodium bromate, potassium bromate, beryllium bromate, magnesium bromate, calcium bromate, ammonium bromate, lithium iodate, sodium iodate, potassium iodate, beryllium iodate, magnesium iodate, calcium iodate, ammonium iodate, and combinations of two or more thereof.

9. A process according to claim 1 wherein said sulfide scavenger is present in said fluid in an amount of 0.0001 to 5 weight % and is selected from the group consisting of sodium bromate, potassium iodate, and combinations thereof.

TABLE VI

Sulfur Species (all ppm by weight) Detected in Sulfide-Amended, Oxygen-Free Water Before and After Addition of Bromate or Iodate

| Time | Bromate-treated | | | | | Iodate-treated | | | | |
|---|---|---|---|---|---|---|---|---|---|---|
| (hrs) | Sulfide-S | Sulfur-S | Sulfite-S | Thiosulfate-S | Sulfate-S | Sulfide-S | Sulfur-S | Sulfite-S | Thiosulfate-S | Sulfate-S |
| 0 | 75 | ND | ND | ND | <0.3 | 75 | ND | ND | ND | <0.3 |
| 19 | <3.8 | a | <1 | <1 | 17 | <3.8 | b | <1 | 13 | 17 |

ND, Not determined
[a]See FIG. 1
[b]See FIG. 2

10. A process according to claim 9 wherein said sulfide is hydrogen sulfide and is present in said fluid in an amount of 0.0001 to 3 weight %.

11. A process according to claim 10 wherein said sulfide scavenger is potassium iodate.

12. A process according to claim 10 wherein said sulfide scavenger is sodium bromate.

13. A process consisting essentially of contacting a hydrogen sulfide-containing fluid derived during the production, gathering and processing of oil or gas with a sulfide scavenger selected from the group consisting of sodium bromate, potassium iodate, and combinations thereof.

14. A process according to claim 13 wherein said hydrogen sulfide is present in said fluid in the range of 0.0001 to 3 weight % and said sulfide scavenger is present in said fluid in the range of 0.0001 to 5 weight % and is potassium iodate.

15. A process according to claim 13 wherein said hydrogen sulfide is present in said fluid in the range of 0.0001 to 3 weight % and said sulfide scavenger is present in said fluid in the range of 0.0001 to 5 weight % and is sodium bromate.

16. A process consisting essentially of contacting a sulfide-containing fluid derived during the production, gathering and processing of oil or gas with a sulfide-scavenging amount of a sulfide scavenger selected from the group consisting of bromates, iodates and combinations of two or more thereof, and separating from said fluid any insoluble precipitates formed upon said step of contacting to produce a fluid that is sulfide reduced.

* * * * *